Jan. 31, 1928.  
G. M. ASHTON  
1,657,655  
TOWING DEVICE FOR AUTOMOBILES  
Filed Feb. 21, 1927  
3 Sheets-Sheet 1

INVENTOR.  
George M. Ashton  
BY Myron J. Dikeman  
ATTORNEY.

Jan. 31, 1928.  1,657,655
G. M. ASHTON
TOWING DEVICE FOR AUTOMOBILES
Filed Feb. 21, 1927  3 Sheets-Sheet 2
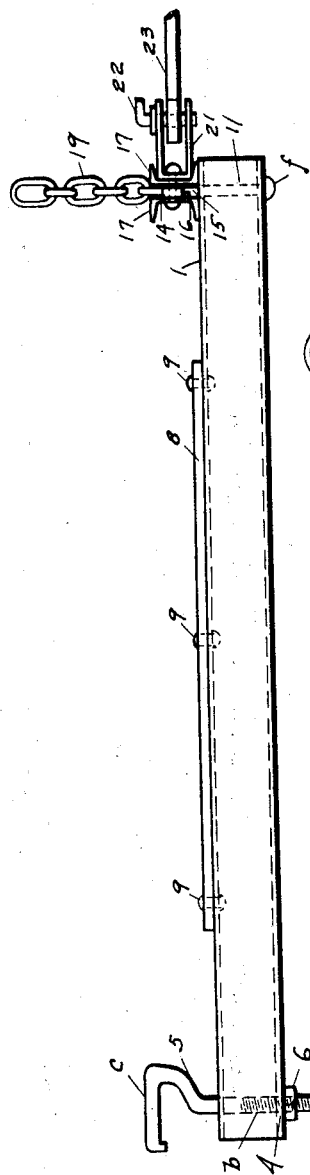
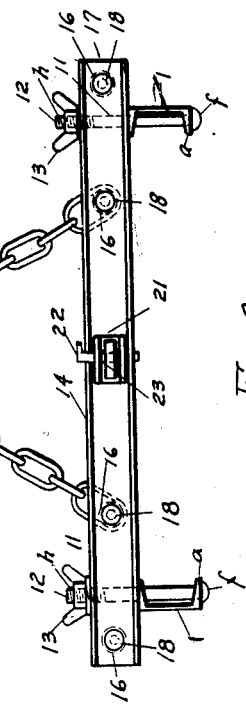
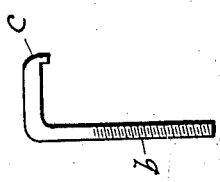
INVENTOR.
George M Ashton
BY Myron J Dikeman
ATTORNEY.

Jan. 31, 1928.   1,657,655
G. M. ASHTON
TOWING DEVICE FOR AUTOMOBILES
Filed Feb. 21, 1927   3 Sheets-Sheet 3

INVENTOR.
George M Ashton
BY
Myron J Dikeman
ATTORNEY.

Patented Jan. 31, 1928.

1,657,655

UNITED STATES PATENT OFFICE.

GEORGE M. ASHTON, OF DETROIT, MICHIGAN.

TOWING DEVICE FOR AUTOMOBILES.

Application filed February 21, 1927. Serial No. 169,837.

The object of my invention is to produce a towing device suitable for attaching and operating with wrecked automobiles, for the purpose of lifting them from the ground, through the application of a service wagon and removing the wrecked automobile to other localities.

Another object is to provide a towing device adapted for engaging with the spring members of an automobile frame and applied in such a manner as to be capable of lifting and drawing the automobile away without the necessity of clamping or attaching the wrecked car to the towing frame.

A further object is to provide a towing device capable of attaching to the various parts of an automobile frame and comprising an adjustable feature which will allow the device to be applied or attached to various sections or parts of the automobile frame without disassembling, and suitable for drawing the car away without exterior members for attaching same thereto.

A still further object is to produce a towing device adapted for lifting, carrying and towing wrecked automobiles that is simple in construction, easily and efficiently attached, and operated by means of its adjustable members, and can be manufactured at a low cost.

These several objects are attained in the preferred form by the construction and arrangement of the parts more fully hereinafter shown.

Similar parts on all drawings are marked by similar numerals.

Fig. 2, is a side view of the frame shown in Fig. 1.

Fig. 3, is an end view of my device showing the cross bar and attached lifting chain.

Fig. 4, is an alternate view of the frame hook.

Figure 1:
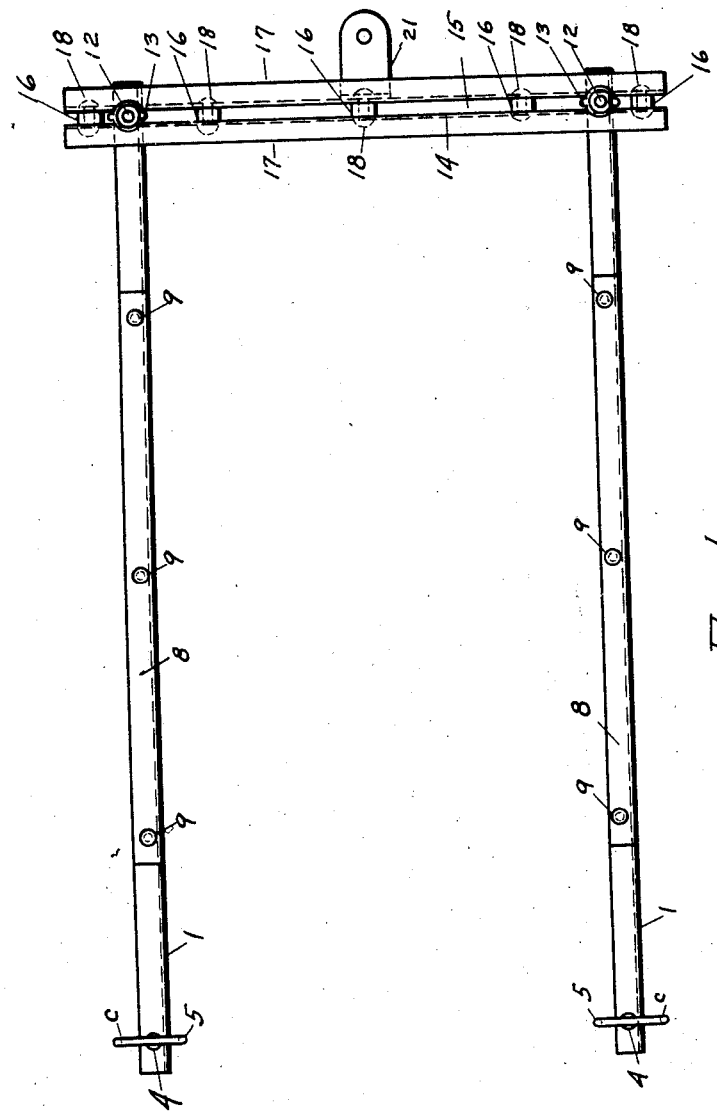
Fig. 1, is a plan view of my device showing the general construction and arrangement of parts.

I will now describe more fully the detail construction of my device, referring to the drawings and the marks thereon.

This invention relates to an improvement in a similar device filed in a prior application, Series #65,587, the improvement herein relating to the new structure design, same being accomplished by improved mechanical means, and application of various adjustable members. While the general principles upon which my device is based is similar to that of my former patent, I lay claim herein to the special adjustable designed features herein shown.

To more clearly set forth this invention, I have herein shown the general features already covered in my prior patent and will describe the general construction thereof in combination with the improved added section and new adjustable features.

Figure 5:
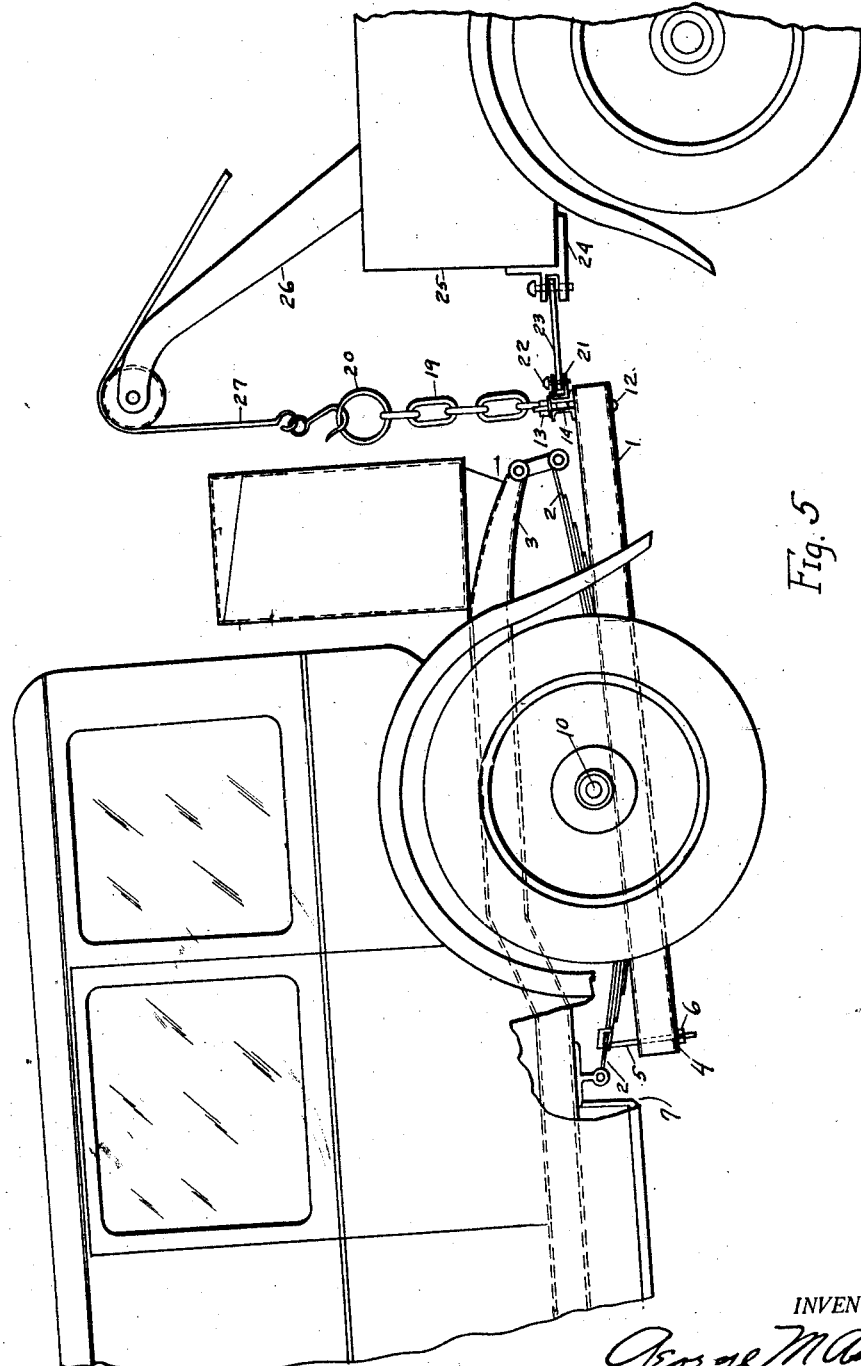
Fig. 5, is an illustration showing the application of my device as applied to an automobile frame for lifting and towing the same away.

My device, as illustrated in the drawings, is preferably made of steel channel frame sections, comprising two side bars —1—, which are preferably made of ordinary channel steel and positioned approximately parallel with each other and of a length to extend beneath the car from the end thereof to nearly the inner end of the automobile springs —2— which are mounted on the automobile frame —3— in the usual manner as illustrated in Fig. 5, of the drawings. The side bars —1— are extended out beyond the end of the automobile body, which is of a sufficient length to hold it clear of the frame and body members of the automobile, when attached thereto. The side bars —1— are preferably positioned edgewise to provide added strength to the members when the load is applied thereon. At the front end of the bars —1— is located a threaded hole —4—, passing through both flanges —a— of the bar, the hole —4— is arranged in a vertical position and carries screwed therein a frame hook —5—. The frame hook —5— is preferably formed with a cylindrical threaded body —b— similar to a bolt and having the upper end thereof designed with a hook shaped end —c— as illustrated in Fig. 2. The hook end being preferably flattened to provide added strength in the required place for supporting the maximum load with the minimum amount of material weight. The actual design of the hook end —c— is not material to the operation of my device but for simplicity and cheapness in manufacturing may be made of a straight hooked bolt as illustrated in Fig. 4. The frame hook —5— is provided with a threaded section of sufficient length to pass through both holes —4— of the channel side bars —1—, and to allow the same to be adjusted to any desired position therein by screwing the frame hook —5— in or out of the threaded holes —4— of the frame. To more securely attach the frame hook —5— to the side bars —1— a lock nut —6— is screwed thereon on both sides of the side bar, which provides means for holding the hook in any desired fixed position, and for engaging any chosen member or section of the automobile frame, and which allows the frame hook —5— to be turned in a sidewise position for engaging the automobile spring members —2— or to engage the automobile step bracket —7— as that illustrated in Fig. 5, or any other member suitable for attaching the hook thereto. Along the top surface of the side bars —1— is attached a wood strip —8— fixedly attached to the side bars by small bolts —9—, passing through both wood strip and bar flange and rigidly holding the wood strip in a fixed position thereon. The wood strip —8— is made of soft wood material and this is one of the essential features for successful and efficient operation of my device. The wood strip —8— is positioned on the top of the side bars —1— to come in contact with and engage with the axle member —10— of the automobile, which soft wood will allow the axle member to imbed therein under the heavy load of the automobile. At the back end of the side bars —1— is positioned a hole —11— which passes through both the upper and lower flanges of the side bars —1— and receive a clamp bolt —12— fixedly mounted therein. The bolt —12— is preferably rigidly connected to the frame, either by being securely driven within the hole —11— or spot welding the head —f— of the bolt, to the flange of the side bars —1—, and fixedly holding the bolt therein. The clamp bolt —12— is of a length to project from the top side of the side bars —1—, a sufficient distance to receive a cross bar thereon and which is provided with threaded ends —h— which carry a locked nut —13— screwed thereon. Mounted across the rear ends or the side bar —1— is a double end bar —14—. The end bar —14— is preferably made of two channel iron sections —17— assembled with an open space —15— therebetween. The space —15— being formed and gaged by the filler separators —16— placed between the channel sections —17— at various intervals and firmly held in place by the rivets —18— passing through both of the channel sections —17—, and the filler —16— and clamping the two channels —17—, into a rigid end frame. Mounted on the rivets —18— over the fillers —16— is the lifting chain —19—, which is of sufficient length to extend above the frame. The lifting chain —19— is provided with a center ring —20— providing means for attaching lifting power thereto. The rivets —18— are placed at various intervals thruout the length of the end frame —14— and by means of the filler —16— providing an open space —15— through which the clamp bolts —12— are inserted, and along which the bolts may be adjusted, thereby adjusting the side bars —1— to various positions which may be securely clamped thereto in any desired position by the lock nut —13— screwed on top of the bolt. At the center of the end bar —14— is attached a fixed clevis —21—. The clevis —21— is provided with a clevis pin —22— passing through the end holes thereof. Pivotally attached to the clevis pin —22— is a draw bar —23—, same being of a sufficient length to engage the draw clevis —24— mounted on the rear end of the service car —25— commonly used for wrecking purposes.

It can readily be seen that by inserting my frame beneath the axle of a wrecked automobile and engaging the frame hooks —5— with some section of the automobile frame parts, and then attach or connect the lifting chain —19— to the crane —26— of the wrecking car, by the crane cable —27— that the automobile may be raised free from the ground and the same readily towed away, by use of the wrecking car through the connecting draw bar —23—.

It is also apparent that by the adjustable members of the frame hooks —5— and the adjustable feature of the end bar —14— that my device can readily be adapted to any size or make of automobile.

Having fully described my towing device, what I claim as my invention and desire to secure by Letters Patent is:

1. A towing device adapted for lifting and towing wrecked automobiles, comprising a combination of two parallel positioned side bars joined together at one end by a double end bar, capable of being attached thereto at various positions along the end bar, means attached to the end member for connecting a draw bar thereto, means attached to the end member for applying lifting power thereto and adjustable hook members mounted in the front end of each bar, capable of turning and engaging various of the automobile frame members.

2. A towing device adapted for lifting and towing wrecked automobiles, comprising the combination of two straight side bar members positioned approximately parallel to each other and having a movable frame hook mounted in one end of each of said bars, the opposite end of the side bars being connected by the double end bar and so arranged as to allow the attachment thereto and adjusted thereon of the side bars, at various positions along the double end bar section, means attached to the center of the end bar adapted for connecting the draw bar thereto and means for attaching a lifting chain to the end bar.

3. A towing device adapted for lifting and towing automobiles, comprising a combination of two side bars arranged approximately parallel with each other, each of said side bar sections having a soft wood strip attached along the top edge thereof, a frame hook bolt mounted in one end of each of the side bar sections and capable of adjustment therein, an adjustable double end bar section attached to the opposite end of the side bars in such a manner as to allow the side bars to be adjusted to various desired positions thereon, a clevis fixedly attached to the center of the said end bar section, capable of attaching a draw bar therein, and a double lifting chain attached to the end bar section for raising the frame.

4. A towing device adapted for lifting and towing wrecked automobiles, comprising a combination of two steel channel iron side bars arranged approximately parallel with each other, a strip of soft wood fixedly attached thereto along the top flange of each of the channel iron bars, and adjustable frame hook mounted in one end of said channel iron side bars, said adjustable frame hook being capable of being adjusted to various positions within the bar, a double end bar, connecting the opposite end of the said side bars, formed of two bar sections so arranged as to provide an intervening space between bars, a clamping bolt fixedly mounted in the same end of the said side bar section and so positioned as to pass through the intervening space between the double end bars and provided with locking means, said clamping bolts being capable of sliding along the double end bar sections for adjusting and clamping the side bars thereto in various desired positions, a clevis fixedly attached to the center of the double end bar and double lifting chains attached to the double end bar for connecting lifting power thereto.

5. A towing device adapted for lifting and towing wrecked automobiles, comprising the combination of two channel iron side bar sections, positioned approximately parallel with each other, each of said side bar sections is provided with a strip of soft wood fixedly attached to the top flange thereof, a frame hook bolt threaded through one end of each of said side bars at a position at right angles to the axis of the bar, said hook bolts passing through both of the side bar flanges and provided with a locking nut thereon, capable of allowing adjustment of the hook frame bolt to various desired positions therein and locking said bolt firmly to the side bar members, an end bar connecting the opposite end of the said channel side bar sections, said end bar being formed of two channel sections placed back to back and separated by small filler separators all being clamped rigidly together by rivets and providing an intervening space tween the channel members, capable of receiving a bolt therein and allowing said bolt to slide lengthwise and adjust to various positions therein, clamp bolts passing through the same end of both of the channel side bars and fixedly attached thereto, said clamp bolts being positioned at a right angle to the axis of said side bar and passing through the intervening slot space between the end bar channel and a locking nut screwed thereon, all so arranged as to allow the channel side bars to be adjusted and locked to the end bar at various desired positions, a draw clevis fixedly attached to the center of the double end bar section and double lifting chains attached to the end bar sections.

In witness whereof, I sign these specifications.

GEORGE M. ASHTON.